Patented June 9, 1942

2,285,855

UNITED STATES PATENT OFFICE 2,285,855

LUBRICATION

Frederick Baxter Downing, Carneys Point, Anthony Francis Benning, Penns Grove, and Frank Willard Johnson, Pennsville, N. J., assignors to E. I. du Pont de Nemours & Company, Wilmington, Del., a corporation of Delaware No Drawing. Original application February 23, 1934, Serial No. 712,610. Divided and this application April 10, 1936, Serial No. 73,642

39 Claims. (Cl. 252—53)

This invention relates to lubrication and particularly to the improvement of extreme pressure lubricating characteristics by the addition of assisting agents.

The advantages of a high pressure lubricant become apparent when the present trend in design of automotive and other machine parts, and the increased strength of metal parts, due to the use of alloy steels, is considered. The pressures ordinarily found in well lubricated journal bearings do not exceed 2,000 lbs./sq. in. and for conditions such as this a film of heavy oil can be expected to remain between the rubbing surfaces. When gears are considered, where the contact between surfaces is of very small width, the bearing pressures often reach values as high as 25,000 lbs./sq. in. Under such extreme pressure, it is unlikely that any oil or grease can be obtained which will be viscous enough to prevent metallic contact. The result of the lack of a lubricating film between the rubbing surfaces results in scoring and scuffing of the gears.

Failure to maintain lubricant films on idle bearing surfaces is now well recognized as the cause of 70 to 80% of the wear occurring on cylinder walls of automotive and other internal combustion engines. When an engine is stopped, the oil film on the vertical surfaces soon drains off and, when the machine is again started up, an appreciable time elapses before the circulation provides oil for the formation of new lubricant films. An assistant which, when added to the motor oil, will prevent the separation of the oil film from the metal should prevent a large part of the wear now occurring.

Prior to this invention various assistants have been added to oils to improve their lubricating properties. Among such assisting materials which have been used are sulfur, sulfur chloride, sulfurized oil or oil containing naturally occurring sulfur, various heavy metal soaps and aluminum soaps, castor oil and, recently, aliphatic and aromatic halides. While some of these assistants, such as the sulfur and the organic halides improve the lubricating properties of the oil to a great extent, they have not proved to be satisfactory for use for the reason that they are corrosive or give rise to corrosive agents by hydrolysis or oxidation. Also, this corrosive action is greatly intensified by the presence of small amounts of water. Some of the alkyl halides are volatile and, hence, are soon lost. Other assistants such as the alkali and heavy metal soaps have proved to be of little value in improving the lubricating properties of the oils.

An object of this invention is to provide materials, which, when brought into contact with metal bearing surfaces, will form a lubricating film between such bearing surfaces, which lubricating film will adhere to the metal surfaces and resist high pressures. A further object of this invention is to provide materials which, when added to lubricating media, improve their properties, particularly their adhesiveness and resistance to high pressure. A still further object is to provide a method for retarding the wearing, scuffing and seizing of bearing surfaces, adapted to operate at high bearing pressures, by contacting such surfaces with materials which will form adherent films on such bearing surfaces, which films will not break down under high bearing pressures. Other objects are to provide new compositions of matter and to advance the art. Still other objects will appear hereinafter.

These objects may be accomplished in accordance with our invention which comprises maintaining a film of a lubricating medium between the metal bearing surfaces and at the same time chemically acting upon such surfaces by means of an organic ester of a phosphorus acid. When such esters are brought into contact with a metal bearing surface under suitable conditions they react with the metal of such surface to form a chemical compound therewith which adheres to such surface forming a noncorrosive lubricating film which will retard the wear of the bearing surfaces, will withstand high bearing pressures and will prevent metallic contact of the bearing surfaces under high bearing pressures. The films have exceptional lubricating properties at all pressures but are particularly valuable at high bearing pressures and at high rubbing speeds. Such films will not be washed from the bearing surfaces by water, oil or organic solvents such as gasoline, naphtha and the like.

In general, the neutral esters of our invention are insufficiently reactive at low temperatures to react with the metal. Further, they have insufficient body to provide thick film lubrication until the temperatures and pressures become sufficiently high to partially decompose them and cause them to react with the metal. Accordingly, such neutral esters must, in general, be employed in a lubricating medium having sufficient body to provide thick film lubrication until the temperatures and pressures become sufficiently high to decompose such esters and cause them to react with the metal. The most satisfactory lubricating medium to be employed with our esters are the hydrocarbon lubricating oils and greases although the animal and vegetable fats and oils may also be employed.

The acid esters, on the other hand, are in general sufficiently reactive at ordinary room temperatures and low bearing pressures so that they will react with the metal to form the desired lubricating film. Accordingly, such acid esters may be employed by themselves. However, it will usually be desired for economical reasons to employ them in a liquid carrying medium or a grease. The liquid carrying medium may be any liquid in which the ester may be dissolved, dispersed, or emulsified. It will be preferred to employ a liquid which is noncorrosive to the metal in the presence of the ester. Among the liquids which have been successfully employed are vegetable oils, kerosene, naphtha, alcohols, water, lubricating oils and greases and particularly the mineral hydrocarbon lubricating oils and greases. However, it will generally be preferred to employ even the acid phosphates in lubricating oils and greases so as to insure lubrication of the bearing surfaces until the ester has an opportunity to react and form the desired lubricating film.

Among the compounds which we have found to be particularly effective for our purpose are the aromatic and aliphatic esters of phosphoric and phosphorous acids. Among the aliphatic esters, those containing a carbon chain of at least 8 carbon atoms have proved to be the most effective and, of these, the mixed esters and mixtures of esters containing long chain aliphatic groups are generally preferred because of their greater solubility in lubricating oils and greases.

When the expression "long chain aliphatic (or alkyl)" is employed hereinafter and in the claims, it will be understood that such expression means aliphatic or alkyl groups containing 8 or more carbon atoms. Also, when the term "phosphorus acids" is employed hereinafter and in the claims, it will be understood that this term includes the various acids of phosphorus such as the various phosphoric, phosphorous and thio phosphorus acids. The term "bearing surfaces" as employed herein and in the claims will be understood to mean surfaces which mutually carry a load and move relatively to each other.

The organic esters of the phosphorus acids of our invention may be employed as the free esters or as their alkali salts such as the sodium, potassium, ammonium and organic amine salts. The addition of as small amount as 0.05% to an oil will have a noticeable effect. However, for practical use, it will generally be found desirable to use at least 0.2%. Further, the amount added to the oil or other carrier will be largely dependent upon the machinery in which it is applied and the area of the metal surfaces with which it will be brought into contact.

The method of testing our compounds was that devised by J. O. Allmen (Oil and Gas Journal, 30, 109, 1931). This method consists of running a ¼" diameter drill rod between two halves of a split bushing which is maintained stationary. The load on the bushing is controllable and provision is made for measuring the torque developed by the friction of the lubricant film. A hydraulic system for increasing the loading on the bushing until the oil film breaks and the metal seizes is provided. The rubbing speed is about 50 feet per minute and the method of loading is gradual, one weight being added to the loading lever each ten seconds. Each weight added to the loading lever increases the pressure on the bushing by about 125 lbs. The machine provides for beam loadings up to 20 weights which corresponds to a pressure of 20,000 lbs./sq. in. on the full projected area of the drill rod. The bearing surface of the bushing is cut to a diameter 0.007 inch larger than the drill rod so that, before any wear occurs, the actual bearing surface is a line. As wear occurs, the bearing surface widens but seldom covers the width of the bushing. After a test, the width of the bearing scar can be measured and an approximate value for the actual bearing pressure obtained. The values given in the following examples represent the calculated actual bearing pressures which were reached in the tests without failure of the film. These values represent film strength or film resistance.

When subjected to the above test, a good grade of paraffin oil will withstand a pressure of only 3 to 5,000 lbs./sq. in. When an oil containing sulfur is tested by the same method, such oil will show a film strength of about 20,000 lbs./sq. in. and will give a torque reading of over 4.0 lbs. ft. at this load.

In order to more clearly illustrate our invention and the advantageous results to be obtained thereby the following examples are given:

*Example 1*

Five tenths percent of dilauryl phosphate $(C_{12}H_{25})_2HPO_4$ is added to a medium viscosity (S. A. E. 30) mineral oil and the whole warmed slightly until the ester has dissolved. When tested by the method hereinbefore described, this oil shows a film resistance of more than 55,000 lbs. per sq. in. and the friction developed is 2.0 to 2.2 lb. ft. When larger amounts of the phosphate up to 4% were added to the same oil, the same results are obtained.

*Example 2*

An oil mixture was made up as in Example 1, except that 1.0% of dicetyl phosphate was employed in place of the dilauryl phosphate. The load carried on test is more than 55,000 lbs. per sq. in. and the torque is 2.0 lb. ft.

*Example 3*

Five percent of tricresyl phosphate was added to a medium viscosity (S. A. E. 30) mineral oil as in Example 1. The load carried on test was more than 25,000 lbs. per sq. in. and the torque developed was 3.5 lb. ft.

*Example 4*

1.0% of dicyclohexyl phosphate was added to a medium viscosity mineral oil (S. A. E. 30). The load carried was 20,000 lbs. per sq. in. and the torque developed was 1.4 lb. ft.

*Example 5*

1% of dioleyl phosphate was added to a mineral oil (S. A. E. 30). The load carried was 45,000 lbs. per sq. in. and the torque was 2.0 lb. ft.

*Example 6*

A lubricant made by dissolving 1% of dilauryl phosphate in a heavy oil (600 W), withstood a pressure of more than 52,000 lbs. per sq. in. and developed a torque at this pressure of 2.2 lb. ft.

*Example 7*

A lubricant was prepared as described in Example 1, except that 1.0% of a mixture of di- and tri-lorol phosphites was employed in place of the dilauryl phosphate. The load carried on test was 51,000 lbs. per sq. in. and the torque at this load was 2.3 lb. ft.

The term lorol as employed in this and other examples and throughout the specification and claims indicates a mixture of primary normal aliphatic alcohols of 8 and 10 carbon atoms which are obtained by fractionation of the alcohols resulting from the reduction of coconut and/or palm kernel oils. These alcohols had a boiling range of 140 to 195° C. at 50 mm. Accordingly, the term "lorol phosphites" means the phosphorous ester of such alcohols.

*Example 8*

One part of triphenyl phosphite ($(C_6H_5)_3 PO_3$) mixed with 100 parts of a lubricating oil withstood a bearing pressure of 48,000 lbs./sq. in. The friction torque was 3.2 lb. ft.

*Example 9*

A medium viscosity mineral oil (SAE 30) containing 1% of trinaphthyl phosphate carried a load of 21,000 lbs. per sq. in., the torque was 2.2 lb. ft.

*Example 10*

A mixture was made up of one part dilorol phosphate and 99 parts of solvent naphtha. Under test, this lubricant withstood a pressure of more than 45,000 lbs. per sq. in. with a friction torque of 2.2 lb. ft.

*Example 11*

One part of dilorol phosphate was mixed with 99 parts of lorol alcohol, comprising a mixture of primary aliphatic alcohols containing 8 to 10 carbon atoms. This mixture withstood a load of 32,000 lbs. per sq. in. developing a torque of 2.1 lb. ft. Under the same conditions of test, a lorol alcohol film, in the absence of the phosphate, will break with less than 4,000 lbs. pressure per sq. in.

*Example 12*

A mixed phosphate ester of lorol and ocenol tested alone withstood a bearing load of 45,000 lbs. per sq. in. with a torque of 2.1 lb. ft.

Ocenol comprises a mixture of primary aliphatic alcohols containing 12 to 18 carbon atoms, having an iodine number of about 50 and is mostly oleyl alcohol.

*Example 13*

5.0% of a naturally occurring phosphate ester, lecithin, was added to a lubricating oil as in Example 1. On test, this mixture withstood a pressure of 52,000 lbs. per sq. in. and developed a torque of 3.0 lb. ft.

*Example 14*

One part of dilorol phosphate was mixed with 200 parts castor oil. This mixture withstood a pressure of 60,000 lbs. per sq. in. The friction torque was 2.4 lb. ft.

*Example 15*

One part of dilorol phosphate was emulsified in 100 parts of water containing a small amount of caustic soda. This emulsion withstood a pressure of 32,000 lbs. per sq. in. with a friction torque of 1.9 lb. ft.

*Example 16*

One part of the a-naphthylamine salt of dilorol phosphate was mixed with 100 parts of lubricating oil. On test, this lubricant withstood a pressure of over 55,000 lbs. per sq. in., at which load the friction torque was 2.4 lb. ft.

*Example 17*

One part of dilauryl dithio phosphate was compounded with 100 parts of lubricating oil. The pressure carried was 34,000 lbs. per sq. in. The torque was 2.1 lb. ft.

*Example 18*

One part of mono lauryl phosphite with 99 parts of petroleum oil gave an Allmen test of over 60,000 lbs. per sq. in. at a torque of 1.9 lb. ft.

The above examples merely illustrate the results obtained with a few of the compounds of our invention. Other compounds coming within our invention which we have found to be effective for our purpose are:

Di-ethyl phosphate
Tri-ethyl phosphate
Mixed cyclohexyl-cyclohexyl phosphates
Tri-ocenol phosphate
Di-octyl phosphate
Mixed mono- and di-lorol phosphates
Mixed octyl lauryl phosphate (di-ester)
Tri-methylricinoleyl phosphate
Lauroxy-ethanol phosphate
The monophosphate of the diglyceride obtained by partial hydrolysis of linseed oil
Mixed phosphate esters of hydroxy stearic acid
Cetyl-pyridinium phosphate
Di-phenyl phosphate
Di-cresyl phosphate
Tri-nitrophenyl phosphate
Tri-hexoxyphenyl phosphate
Mixed tertiaryamylphenyl phosphates
Mixed dodecahydro-diphenylol-propane phosphates
Mixed mono- and di-decahydro-b-naphthyl phosphates
Mixed tetrahydro-b-naphthyl phosphates
Dilorol cresyl phosphate
Dibutylamine salt of mixed phosphates of lorol
Benzylamine salt of mixed phosphates of lorol
Amylamine salt of mixed phosphates of lorol
Mixed mono- and di-butyl phosphates
Dilauryl trithio phosphite The mono- di- and tri-esters corresponding with those heretofore mentioned may also be mentioned. Esters of phosphorus acids may be obtained by the treatment of a mineral or natural oil with phosphorus halides and a catalyst such as aluminum chloride. Phosphate and phosphite esters can also be obtained by the treatment of oils containing ethylene linkages or hydroxyl groups with phosphorus halides, oxy halides, oxides, sulfides, etc. The resultant esters will be found to be effective for our purpose and come within the scope of our invention.

From the preceding description it will be apparent that the organic esters generally of the phosphorus acids are lubricants for metallic surfaces and suitable assistants to be added to lubricating oils, greases and other liquids to form lubricating compositions for metallic surfaces and which will be effective at extreme pressures.

The compounds of our invention, when brought into contact with metal bearing surfaces, apparently form an adherent film thereon which film will withstand high bearing pressures without breaking down and thus will prevent metallic contact of the bearing surfaces. When incorporated in an oil or grease, our compounds cause the oil and grease to adhere more firmly to the bearing surfaces. This is a particularly desirable and advantageous characteristic of our compounds, particularly adapting them for use where the bearing surfaces are vertical and an ordinary oil tends to drain therefrom, as in the cylinders of internal combustion engines. Furthermore, the film produced by our compounds remains on the bearing surfaces even after the oil or other carrying media has been drained off and continues to exert its effect until worn off. Such film will not be removed by washing with water, gasoline, solvent naphtha and the like.

Our compounds are non-corrosive and, in fact, some of them will inhibit corrosion of metal by water. Our compounds are effective where the rubbing speeds are high as well as where they are low as in gears.

The fact that our compounds retain their extreme pressure lubricating characteristics in liquids other than oils and greases renders them particularly adapted for use as cutting oils, particularly in water emulsion. Our compounds may be employed in other liquids than those mentioned in the examples. For instance, they may be employed in benzene, gasoline, diphenyl, diphenyl oxide and any other liquid which is non-corrosive to metal and in which our compounds may be dissolved, dispersed or emulsified.

The use of cutting oils in machining operations is well known. The cutting fluid has two functions; the first to provide a lubricant to reduce the friction between the cutting tool and the work, and the second to provide a means for cooling the work.

The general practice is to use either an oil or a dispersion of oil in water. The oils used vary considerably depending on the particular operation and may vary from a light mineral oil to a heavy mixture of mineral and animal oils. The water suspensions are usually made up from oils by the addition of dispersing agents of the Turkey red oil type. Recently the practice of adding sulfur or sulfur compounds has become common.

Die shaping of sheet metals and drawing of sheets and wires and tubes has also recently been improved by the use of a lubricant between the contacting surfaces.

Cutting oils are now generally made up by compounding about 30 parts of lard oil, one to five parts of sulfur, two to ten parts of a petroleum sulfonate or Turkey red oil and about 60 parts of mineral oil. This mixture is then used undiluted or dispersed in water which improves its cooling properties.

The lard oil, of course, breaks down under the high temperature conditions of use resulting in the formation of disagreeably odorous materials. The presence of sulfur, as in motor and gear lubricants, is a possible source of corrosive material necessitating the careful washing of machined parts before use. These oils have also given considerable trouble from infection of the workmen which is only partially eliminated by the incorporation of a bactericide in the oil.

Wire drawing also requires an extreme pressure lubricant. Several types are in use but essentially they are the same as the ordinary cutting oils.

The pressures between the rubbing surfaces during all machining operations are obviously very high as they result in deformation of the metal. This is, therefore, another problem of extreme pressure lubrication.

Our compounds may be used in water, oil or other suitable media as cutting oil compositions with the attending elimination of the odors and corrosiveness which are objectionable properties of most prior cutting oils. They will be effective at very low concentrations in oil and can be used in water directly without the use of an oil medium.

Other improvements similar to those observed on bearing lubrication should also result from such use. Decreased friction, safety from corrosion, and improved quality of the work are important results of their use.

The compounds of our invention are in general well known and the methods for making them are also well known and described in the literature. These methods generally comprise the treatment of alcohols, unsaturated aliphatic compounds or phenols with phosphorus chlorides or with phosphorous oxy chlorides or oxides. Accordingly, a detailed description of the methods to be employed for making the compounds referred to in this application is believed to be unnecessary.

This is a division of our co-pending application Serial Number 712,610, filed February 23, 1934.

While we have disclosed specific embodiments of our invention, it will be readily apparent to those skilled in the art that many modifications and variations may be made therein without departing from the spirit of our invention. Accordingly, the scope of our invention is to be limited solely by the appended claims construed as broadly as is permissible in view of the prior art.

We claim:

1. A lubricant consisting of a hydrocarbon oil and a small quantity of an aryl ester of phosphorus acid.

2. The method of retarding the wearing, scuffing or seizing of or reducing the friction between relatively moving bearing surfaces operating at high pressures or high speeds such that an ordinary lubricating oil will not be retained between such surfaces, which comprises maintaining on such bearing surfaces a thin lubricating film formed by the action of an ester of a phosphorous acid which film is formed by maintaining in contact with such bearing surfaces a hydrocarbon lubricating oil having incorporated therein a small amount of said ester as the primary thin film forming addition agent.

3. The method of lubricating relatively moving bearing surfaces at pressures, temperatures or speeds such that an ordinary lubricating oil will be unable to provide effective lubrication, which comprises maintaining on such bearing surfaces a thin lubricating film formed by the chemical action of an ester of a phosphorous acid on such bearing surface which film is produced by maintaining in contact with such bearing surfaces a petroleum lubricating oil having incorporated therein a small amount of said ester as the primary thin film forming agent.

4. The method of lubricating relatively moving bearing surfaces at pressures, temperatures or speed such that an ordinary lubricating oil will be unable to provide effective lubrication, which comprises maintaining on such bearing surfaces a thin lubricating film formed by the chemical action of a hydrocarbon ester of a phosphorous acid on such bearing surface which film is produced by maintaining in contact with such bearing surfaces a petroleum lubricating oil having incorporated therein a small amount of said ester as the primary thin film forming agent.

5. The method of lubricating relatively moving bearing surfaces at pressures, temperatures or speeds such that an ordinary lubricating oil will be unable to provide effective lubrication, which comprises maintaining on such bearing surfaces a thin lubricating film formed by the chemical action of a hydrocarbon ester of phosphorous acid on such bearing surface which film is produced by maintaining in contact with such bearing surfaces a petroleum lubricating oil having incorporated therein a small amount of said ester as the primary thin film forming agent.

6. The method of lubricating relatively moving bearing surfaces at pressures, temperatures or speeds such that an ordinary lubricating oil will be unable to provide effective lubrication, which comprises maintaining on such bearing surfaces a thin lubricating film formed by the chemical action of an aryl ester of phosphorous acid on such bearing surface which film is produced by maintaining in contact with such bearing surfaces a petroleum lubricating oil having incorporated therein a small amount of said ester as the primary thin film forming agent.

7. The method of lubricating relatively moving bearing surfaces at pressures, temperatures or speeds such that an ordinary lubricating oil will be unable to provide effective lubrication, which comprises maintaining on such bearing surfaces a thin lubricating film formed by the chemical action of triphenyl phosphite on such bearing surface which film is produced by maintaining in contact with such bearing surfaces a petroleum lubricating oil having incorporated therein a small amount of said triphenyl phosphite as the primary thin film forming agent.

8. The method of lubricating relatively moving bearing surfaces at pressures, temperatures or speeds such that an ordinary lubricating oil will be unable to provide effective lubrication, which comprises maintaining on such bearing surfaces a thin lubricating film formed by the chemical action of an alkyl ester of phosphorous acid on such bearing surface which film is produced by maintaining in contact with such bearing surfaces a petroleum lubricating oil having incorporated therein a small amount of said ester as the primary thin film forming agent.

9. The method of lubricating relatively moving bearing surfaces at pressures, temperatures or speeds such that an ordinary lubricating oil will be unable to provide effective lubrication, which comprises maintaining on such bearing surfaces a thin lubricating film formed by the chemical action of a lorol phosphite on such bearing surface which film is produced by maintaining in contact with such bearing surfaces a petroleum lubricating oil having incorporated therein a small amount of said lorol phosphite as the primary thin film forming agent.

10. A motor oil normally tending to produce corrosion of bearing metals of the cadmium-silver alloy type under conditions of automotive use, having added thereto a small proportion, not more than two percent, of triphenyl-phosphite sufficient substantially to retard corrosion.

11. A motor oil normally tending to produce corrosion of bearing metals of the cadmium-silver alloy type under conditions of automotive use, having added thereto a small proportion of a neutral organic ester of a phosphorous acid sufficient substantially to retard corrosion.

12. A motor oil normally tending to produce corrosion of bearing metals of the cadmium-silver alloy type under conditions of automotive use, having added thereto a small proportion of a tri-aryl ester of a phosphorous acid sufficient substantially to retard corrosion.

13. A motor oil normally tending to produce corrosion of bearing metals of the cadmium-silver alloy type under conditions of automotive use, having added thereto a small proportion of a tri-alkyl ester of a phosphorous acid sufficient substantially to retard corrosion.

14. A motor oil normally tending to produce corrosion of bearing metals of the cadmium-silver alloy type under conditions of automotive use, having added thereto a small proportion of a neutral organic ester of phosphorous acid sufficient substantially to retard corrosion.

15. A motor oil normally tending to produce corrosion of bearing metals of the cadmium-silver alloy type under conditions of automotive use, having added thereto a small proportion of a tri-aryl ester of phosphorous acid sufficient substantially to retard corrosion.

16. A motor oil normally tending to produce corrosion of bearing metals of the cadmium-silver alloy type under conditions of automotive use, having added thereto a small proportion of a tri-alkyl ester of phosphorous acid sufficient substantially to retard corrosion.

17. A lubricant for metallic bearing surfaces comprising a major proportion of a petroleum lubricating oil and a minor proportion of an organic ester of a phosphorous acid.

18. A lubricant for metallic bearing surfaces comprising a major proportion of a petroleum lubricating oil and a minor proportion of an aromatic ester of a phosphorous acid.

19. A lubricant for metallic bearing surfaces comprising a major proportion of a petroleum lubricating oil and a minor proportion of an aromatic ester of a phosphorous acid in which each aromatic group contains only one benzene ring.

20. A lubricant for metallic bearing surfaces comprising a major proportion of a petroleum lubricating oil and a minor proportion of an aliphatic ester of a phosphorous acid.

21. A lubricant for metallic bearing surfaces comprising a major proportion of a petroleum lubricating oil and a minor proportion of a hydrocarbon ester of a phosphorous acid.

22. A lubricant for metallic bearing surfaces comprising a major proportion of a petroleum lubricating oil and a minor proportion of an aryl ester of a phosphorous acid.

23. A lubricant for metallic bearing surfaces comprising a major proportion of a petroleum lubricating oil and a minor proportion of an alkyl ester of a phosphorous acid.

24. A lubricant for metallic bearing surfaces comprising a major proportion of a petroleum lubricating oil and a minor proportion of a tri-aryl ester of a phosphorous acid.

25. A lubricant for metallic bearing surfaces comprising a major proportion of a petroleum lubricating oil and a minor proportion of a tri-phenyl ester of a phosphorous acid.

26. A lubricant for metallic bearing surfaces comprising a major proportion of a petroleum lubricating oil and a minor proportion of a tri-alkyl ester of a phosphorous acid.

27. A lubricant for metallic bearing surfaces comprising a major proportion of a petroleum lubricating oil and a minor proportion of a long chain aliphatic ester of a phosphorous acid.

28. A lubricant for metallic bearing surfaces comprising a major proportion of a petroleum lubricating oil and a minor proportion of an organic ester of phosphorous acid.

29. A lubricant for metallic bearing surfaces comprising a major proportion of a petroleum lubricating oil and a minor proportion of a neutral organic ester of phosphorous acid.

30. A lubricant for metallic bearing surfaces comprising a major proportion of a petroleum lubricating oil and a minor proportion of a trihydrocarbon ester of phosphorous acid.

31. A lubricant for metallic bearing surfaces comprising a major proportion of a petroleum lubricating oil and a minor proportion of a tri-aromatic ester of phosphorous acid.

32. A lubricant for metallic bearing surfaces comprising a major proportion of a petroleum lubricating oil and a minor proportion of a tri-aromatic ester of phosphorous acid in which each aromatic group contains only one benzene ring.

33. A lubricant for metallic bearing surfaces comprising a major proportion of a petroleum lubricating oil and a minor proportion of a tri-aryl ester of phosphorous acid in which each aryl group contains only one benzene ring.

34. A lubricant for metallic bearing surfaces comprising a major proportion of a petroleum lubricating oil and a minor proportion of a tri-aliphatic ester of phosphorous acid.

35. A lubricant for metallic bearing surfaces comprising a major proportion of a petroleum lubricating oil and a minor proportion of a tri-long chain aliphatic ester of phosphorous acid.

36. A lubricant for metallic bearing surfaces comprising a major proportion of a petroleum lubricating oil and a minor proportion of a tri-long chain alkyl ester of phosphorous acid.

37. A lubricant for metallic bearing surfaces comprising a major proportion of a petroleum lubricating oil and a minor proportion of tri-lorol phosphite.

38. A lubricant for metallic bearing surfaces consisting of a major proportion of a mineral lubricating oil and a minor amount of an aliphatic ester of phosphorous acid.

39. A lubricant for metallic bearing surfaces comprising a major proportion of a petroleum lubricating oil and a minor proportion of di-lorol phosphite.

FREDERICK BAXTER DOWNING.
ANTHONY FRANCIS BENNING.
FRANK WILLARD JOHNSON.